United States Patent [19]

East

[11] 4,421,908
[45] Dec. 20, 1983

[54] PREPARATION OF POLYESTERS BY DIRECT CONDENSATION OF HYDROXYNAPHTHOIC ACIDS, AROMATIC DIACIDS AND AROMATIC DIOLS

[75] Inventor: Anthony J. East, Madison, N.J.

[73] Assignee: Celanese Corporation, New York, N.Y.

[21] Appl. No.: 355,991

[22] Filed: Mar. 8, 1982

[51] Int. Cl.$^3$ ............... C08G 63/18; C08G 63/60
[52] U.S. Cl. ......................... 528/181; 528/176; 528/179; 528/180; 528/190
[58] Field of Search ............... 528/176, 179–181, 528/190, 271

[56] References Cited

U.S. PATENT DOCUMENTS

| | | | |
|---|---|---|---|
| 4,256,624 | 3/1981 | Calundann | 528/190 |
| 4,318,841 | 3/1982 | East et al. | 528/190 |
| 4,318,842 | 3/1982 | East et al. | 528/190 |
| 4,337,190 | 6/1982 | Calundann | 528/190 |
| 4,347,349 | 8/1982 | Siemionko | 528/190 |

FOREIGN PATENT DOCUMENTS 53-36594 4/1978 Japan .

*Primary Examiner*—Lester L. Lee
*Attorney, Agent, or Firm*—Burns, Doane, Swecker & Mathis

[57] ABSTRACT

Provided is a method for preparing melt-processable polyesters efficiently via the direct polymerization of a hydroxynaphthoic acid, an aromatic dicarboxylic acid and an aromatic diol. By the direct polymerization method, the hydroxy and acid moieties are reacted directly effectively and efficiently without the use of acetylated reactants in the presence of a catalyst comprising a metal selected from the group consisting of the Group IV and V metals.

15 Claims, No Drawings

PREPARATION OF POLYESTERS BY DIRECT CONDENSATION OF HYDROXYNAPHTHOIC ACIDS, AROMATIC DIACIDS AND AROMATIC DIOLS

BACKGROUND OF THE INVENTION

1. Field of the Invention

The present invention relates to a process for preparing melt-processable aromatic polyesters via direct condensation of aromatic diacids, aromatic diols and aromatic hydroxy acids. More specifically, the present invention relates to a process of directly polymerizing aromatic diacids, aromatic diols and hydroxynaphthoic acids, which polymerization is conducted in a melt phase and in the presence of a catalytic amount of a Group IV or V metal compound.

2. Description of the Prior Art

Wholly aromatic polyester resins, with the aromatic polyester being considered to be "wholly" aromatic in the sense that each moiety present contributes at least one aromatic ring to the polymer backbone, have long been known. For instance, 4-hydroxybenzoic acid homopolymer and copolymers have been provided in the past and are commercially available. Those wholly aromatic polyesters normally encountered in the prior art have tended to be somewhat intractable in nature and to present substantial difficulties if one attempts to melt process the same while employing conventional melt processing procedures. Such polymers commonly are crystalline in nature, relatively high melting or possess a decomposition temperature which is below the melting point, and when molten frequently exhibit an isotropic melt phase. Molding techniques such as compression molding or sintering may be utilized with such materials; however, injection molding, melt spinning, etc., commonly have not been viable alternatives or when attempted commonly have been accomplished with difficulty.

Representative publications which discuss wholly aromatic polyesters include: (a) "Polyesters of Hydroxybenzoic Acids," by Russell Gilkey and John R. Caldewell, *J. of Applied Polymer Sci.*, Vol. II, Pages 198 to 202 (1959), (b) "Polyarylates (Polyesters From Aromatic Dicarboxylic Acids and Bisphenols," by G. Bier, *Polymer*, Vol. 15, Pages 527 to 535 (August 1974), (c) "Aromatic Polyester Plastics," by S. G. Cottis, *Modern Plastics,* Pages 62 to 63 (July 1975); and (d) "Poly(p-Oxybenzoyl Systems): Homopolymer for Coatings: Copolymers for Compression and Injection Molding," by Roger S. Storm and Steven G. Cottis, *Coatings Plast. Preprint,* Vol. 34, No. 1, Pages 194 to 197 (April 1974). See also, U.S. Pat. Nos. 3,039,994; 3,169,121; 3,321,437; 3,553,167; 3,637,595; 3,651,014; 3,723,338; 3,759,870; 3,767,621; 3,778,410; 3,787,370; 3,790,528; 3,829,406; 3,890,256; and 3,975,487.

Also, it has been disclosed that certain polyesters may be formed which exhibit melt anisotropy. See for instance, (a) "Polyester X7G-A Self Reinforced Thermoplastic," by W. J. Jackson Jr., H. F. Kuhfuss, and T. F. Gray, Jr., 30th Anniversary Technical Conference, 1975 Reinforced Plastics/Composites Institute. *The Society of the Plastics Industry, Inc.,* Section 17-D, Pages 1 to 4, (b) Belgian Pat. Nos. 838,935 and 828,936, (c) Dutch Pat. No. 750551, (d) West German Pat. Nos. 2520819, 2520820, 2722120, 2834535, 2834536 and 2834537, (e) Japanese Pat. Nos. 43-223; 2132-116; and 3021-293, (f) U.S. Pat. Nos. 3,991,013; 3,991,014; 4,057,597; 4,066,620; 4,067,852; 4,075,262; 4,083,829; 4,118,372; 4,130,545; 4,130,702; 4,156,070; 4,159,365; 4,169,933; 4,181,792; 4,183,895; 4,188,476; 4,189,996; 4,201,856; 4,224,433; 4,226,970; 4,230,817; 4,232,143; 4,232,144; 4,238,598; 4,238,600; 4,239,599; 4,242,496; 4,245,082; 4,254,084; 4,247,514; 4,256,802; 4,269,965; 4,287,332; and 4,294,955; and (g) U.K. application No. 2,002,404.

Additionally, in commonly assigned U.S. Pat. No. 4,161,470 is claimed a polyester of 6-hydroxy-2-naphthoic acid and para-hydroxy benzoic acid, and in commonly assigned U.S. Pat. No. 4,219,461 is claimed a polyester of 6-hydroxy-2-naphthoic acid, para-hydroxybenzoic acid, aromatic diol, and aromatic acid. Moreover, in commonly assigned U.S. Pat. No. 4,256,624, is claimed a polyester of 6-hydroxy-2-naphthoic acid, an aromatic diol and an aromatic diacid. Each of these polyesters exhibits an anisotropic melt phase and is capable of readily undergoing melt processing to form quality fibers, molded articles, etc.

An established procedure for preparing aromatic polyesters of fiber-forming molecular weight is by thermally reacting aromatic acetate moieties with aromatic carboxylic acid moieties. In other words, the aromatic hydroxy groups are acetylated. The use of acetylated reactants has been of utmost importance when preparing a polyester of an aromatic hydroxy acid since certain aromatic hydroxy acid compounds tend to decarboxylate upon direct esterification. For example, para-hydroxybenzoic acid is notorious for severe decarboxylation upon attempted direct esterification. Decarboxylation adversely effects the yield of the process, the nature and composition of the final product, and the economic viability of the process.

A reaction involving acetylated reactants, however, liberates acetic acid which is corrosive and thus requires the use of special corrosion-resistant equipment. A further disadvantage is that the esterified or acetylated reactants are far more costly than the unesterified reactants, as they require an acetylation step to make them. Accordingly, a polyesterification involving an aromatic hydroxy acid wherein all hydroxy and acid moieties are efficiently and effectively reacted directly would be of advantage since the high cost of using esterified products would be avoided and by-product water presents far less of a disposal problem than the acetic acid involved with ester reactants.

The polycondensation of a phenolic moiety with an aromatic carboxylic acid moiety, in general, has been found to be impracticable or simply not to work. However, some limited success has been achieved.

For example, U.S. Pat. No. 4,093,595 discloses a catalytic procedure for the preparation of polyesters from (1) dihydric phenols and (2) aromatic dicarboxylic acids by direct polymerization in the presence of an antimony, tin or titanium catalyst. The patent does not, however, address the problem of aromatic hydroxy acid decarboxylation upon direct esterification, nor suggest any method for the direct formation of polyesters of a hydroxynaphthoic acid such as those disclosed in the aforenoted U.S. Ser. No. 54,049 (now U.S. Pat. No. 4,256,624). Dihydric phenols and aromatic dicarboxylic acids are the only reactants used.

William W. Lowrance, Jr., in *Tetahedron Letters*, No. 37, pp. 3453–3454 (1971), discloses that phenyl esters such as phenyl benzoates can be prepared by direct esterification upon refluxing a solution containing phenol, benzoic acid and catalytic amounts of boric and sulfuric acids. The article does not pertain to the preparation of polyesters or to the direct reaction of aromatic hydroxy acids.

Higashi et al. in *Journal of Polymer Science: Polymer Letters Edition*, Vol. 18, pp. 385–388 (1980), disclose that aromatic polyesters can be prepared directly from aromatic hydroxy acids such as p- and m-hydroxybenzoic acids, as well as a combination of dicarboxylic acids and bisphenols, by conducting the polycondensation in the presence of hexachlorocyclotriphosphatriazene in pyridine. The use of such a promoter, however, has many disadvantages, e.g., cost.

Thus, an efficient and economically attractive process for preparing melt-processable, aromatic hydroxy acid comprising polyesters via direct polycondensation, and in particular, such a process for preparing polyesters via the direct polymerization of aromatic dicarboxylic acids, aromatic diols and a hydroxy naphthoic acid, is heretofore unknown to the prior art and is a desideratum thereof.

Accordingly, it is an object of the present invention to provide a novel and more economically attractive process for preparing wholly aromatic polyesters of aromatic dicarboxylic acids, aromatic diols and a hydroxynaphthoic acid.

It is another object of the present invention to provide a process for preparing wholly aromatic polyesters which is free of the problem of decarboxylation of aromatic hydroxy acids and the adverse effects thereof.

Another object of the present invention is to provide a direct polycondensation process for preparing the polyesters claimed in U.S. Pat. No. 4,256,624.

Still another object of the present invention is to provide a process for the direct polymerization of hydroxynaphthoic acids, aromatic diacids and diols to form a polyester without suffering from decarboxylation problems.

These and other objects, as well as the scope, nature and utilization of the invention, will be apparent to those skilled in the art from the following description and the appended claims.

SUMMARY OF THE INVENTION

It has now surprisingly and unexpectedly been found that wholly aromatic polyesters of a hydroxynaphthoic acid, an aromatic dicarboxylic acid and an aromatic diol can be effectively prepared by direct polycondensation. The process comprises reacting at least one hydroxynaphthoic acid, at least one aromatic dicarboxylic acid and at least one aromatic diol in the presence of a catalytic amount of a metal catalyst under reaction conditions sufficient for polymerization and formation of a wholly aromatic polyester, with the temperature preferably being sufficient to maintain at least one reactant and the resultant polyester in a melt phase. The metal catalyst employed comprises a compound of a metal selected from the group consisting of the metals of Groups IV and V of the Periodic Table. By the process of the present invention, the hydroxynaphthoic acid has been found to not decarboxylate and thereby allow for an effective and efficient process of direct polycondensation.

In a preferred embodiment, 6-hydroxy-2-naphthoic acid is directly polycondensed with an aromatic dicarboxylic acid and an aromatic diol.

DESCRIPTION OF THE PREFERRED EMBODIMENTS

The process of the instant invention provides one with a process which effectively, efficiently and directly allows one to prepare a polyester of a hydroxynaphthoic acid, an aromatic dicarboxylic acid and an aromatic diol. The direct polycondensation of the reactants is accomplished in the presence of a catalytic amount of a metal catalyst, wherein the metal is selected from the group consisting of the metals of Groups IV and V of the Periodic Table. Preferably, the catalyst is a salt, oxide or organo-metallic derivative of either antimony, titanium, tin or germanium, with tin compounds being the most preferred for reasons of catalyst activity.

Representative examples of suitable catalysts, without being limited thereto, include the dialkyl tin oxides such as dibutyl and dimethyl tin oxide, diaryl tin oxides such as diphenyl tin oxide, dialkyl tin esters such as dibutyl tin diacetate, stannous sulfate, stannous oxalate, dimethoxy tin, titanium dioxide, titanium alkoxides, tetrabutyl titanate, tetraisopropyl titanate, tetraphenyl titanate, dicyclopentadienyldiphenyl titanium, antimony trioxide, germanium dioxide and mixtures thereof. Dialkyl tin diacetate is the most preferred catalyst.

The amount of catalyst employed is a catalytically effective amount, which is an amount sufficient to increase the rate of polymerization, which can be measured by the inherent viscosity of the resulting polyester. The quantity of catalyst utilized is typically in the range from about 0.001 to about 5.0 weight percent based upon the total monomer reactant weight, with from 0.001 to about 1.0 weight percent being preferred, and from 0.05 to about 0.5 weight percent being most preferred.

One of the reactants of the instant invention is a hydroxynaphthoic acid, and most preferably, 6-hydroxy-2-naphthoic acid. The naphthalene ring can additionally be substituted with substituents inert in the polymerization reaction, e.g., alkyl, halo, alkoxy, aryl, and mixtures thereof. When the substituent is an alkyl or alkoxy, it preferably contains from 1 to about 4 carbons. When the substituent is an aryl, it preferably contains from 6 to 10 carbons (e.g., phenyl). When the substituent is a halogen, it may be fluorine, chlorine, bromine or iodine. The presence of such ring substituents can tend to modify to some degree the physical properties of the resulting polyester polymer, e.g., the polymer may soften at a lower temperature, its impact strength may be improved, and the crystallinity of the solid polymer formed may be decreased. The specific properties desired in the polyester product will influence the choice of substituents on the hydroxynaphthoic acid reactant. In a preferred embodiment, 6-hydroxy-2-naphthoic acid without any further ring substitution is employed.

The amount of hydroxynaphthoic acid employed can vary greatly, but is generally within the range of from about 10 to 90 mole percent of the total monomer reactants, more preferably in the range from about 20 to 80 mole percent, and most preferably in a range from about 60 to 80 mole percent.

If desired, minor amounts of other aromatic hydroxy acids can be used in conjunction with the hydroxynaphthoic acid, for example, up to 20 mole percent of the total monomer reactants. Mixtures of hydroxynaphthoic acids may also be employed.

The aromatic dicarboxylic acid reactant of the instant invention can contain one or more aromatic rings, with the carboxyl groups being attached to the same or different rings. Where the aromatic dicarboxylic acid contains more than one aromatic ring, the rings may be fused, e.g., as in a naphthalene or anthracene moiety or connected by a bond or a divalent radial such as an alkyl, oxy, thio or thionyl radical. The dicarboxylic acid is preferably symmetrical in the sense that the carboxyl groups are symmetrically disposed, e.g., para to each other when on one aromatic ring or diagonally disposed, i.e., 2 and 6 positions, when present on a naphthalene ring. If desired, the acid ring or rings may bear one or more substituents, such as an alkyl, halo, alkoxy or aryl substituent, which is inert in the polymerization reaction. When the substituent is an alkyl or alkoxy, it preferably contains from 1 to about 4 carbons. When the substituent is an aryl, it preferably contains from 6 to 10 carbons (e.g., phenyl), and when the substituent is a halogen, it may be fluorine, chlorine, bromine or iodine.

In the reaction, the amount of aromatic dicarboxylic acid employed can vary greatly and will depend upon the type of properties the polyester product is to possess. In forming an anisotropic, melt processable polyester, however, it is preferred that the amount of aromatic dicarboxylic acid used is from about 5 to about 45 mole percent of the total monomer reactants, more preferably from about 10 to about 40 mole percent, and most preferably from about 10 to about 20 mole percent.

Representative examples of suitable aromatic dicarboxylic acids for purposes of the instant invention include terephthalic acid, isophthalic acid, 2,6 and 2,7-naphthalene dicarboxylic acids, 4,4'-biphenyldicarboxylic acid, 4,4'-p-oxydibenzoic acid, 4,4'-p-thiodibenzoic acid, 4,4'-p-thionyldibenzoic acid, and mixtures thereof. A particularly preferred aromatic dicarboxylic acid is terephthalic acid.

The aromatic diol reactant of the instant invention can also contain one or more aromatic rings, with the hydroxyl groups being attached to the same or different rings. Where the aromatic dicarboxylic acid contains more than one aromatic ring, the rings may be fused, e.g., as in a naphthalene or anthracene moiety, or connected by a bond or a divalent radical such as an alkyl, oxy, thio, thionyl, or sulfonyl radical. The aromatic diol is preferably symmetrical in the sense that the hydroxyl groups are symmetrically disposed, e.g., para to each other when on one aromatic ring or diagonally disposed, i.e., 2 and 6 positions, when present on a naphthalene ring. If desired, the diol ring or rings may also bear one or more substituents, such as an alkyl, alkoxy, aryl or halo substituent, which is inert in the polymerization reaction. An alkyl or alkoxy substituent preferably contains from 1 to about 4 carbons, and an aryl substituent preferably contains from 6 to 10 carbons (e.g., phenyl).

The amount of aromatic diol employed in the reaction will vary based upon the desired properties of the resultant product. It is preferred, however, in forming an anisotropic, melt processable polyester in accordance with the instant invention that the amount of aromatic diol used be in the range from about 5 to about 45 mole percent of the total monomer reactants, more preferably from about 10 to about 40 mole percent, and most preferably from about 10 to about 20 mole percent. A slight excess of aromatic diol can be used to compensate for any loss by volatilization or sublimation.

Representative examples of suitable aromatic diols include hydroquinone, resorcinol, methylhydroquinone, chlorohydroquinone, bromohydroquinone, phenylhydroquinone, 4,4'-biphenol, 4,4'-p-oxybiphenol, 4,4'-p-methylbiphenol, 4,4'-sulfonylbiphenol, 2,6-dihydroxynapththalene, etc., and mixtures thereof. A particularly preferred aromatic diol is hydroquinone.

In general, it is preferred to conduct the reaction of the instant invention under conventional conditions for melt polymerization, with the hydroxynaphthoic acid, aromatic diacid and aromatic diol being reacted in the presence of a catalytic amount of a suitable metal catalyst. The time, temperature and pressure conditions to be employed for optimum results depends on the specific reactants used and on the specifically selected catalyst. It is important, however, that the reactants and the resulting polymer suffer no substantial degradation under the polymerization conditions.

The temperature must be at least high enough so that melt polymerization may be carried out, i.e., so that at least one of the reactants and the aromatic polyester polymer product is in a melt phase. Temperatures in the range of from about 250° C. to about 360° C. can generally be employed, with a temperature in the range from about 260° C. to about 350° C. being preferred, and a temperature in the range from about 270° C. to about 340° C. being most preferred. However, the temperature should ordinarily not be so great as to cause degradation of the polymer as may be observed from undue darkening of the polymer.

If desired, a vacuum can be applied at a suitable place in the polymerization to rapidly remove water and to hasten the polymerization after sufficient reaction has taken place so that the loss of reactants through sublimation or other means is minimized. Other than during the vacuum cycle, the reaction is conducted generally at atmospheric pressure, although this may vary if desired. Also, to minimize oxidation, the reaction is preferably carried out in an inert atmosphere such as nitrogen or argon.

Other polymerization techniques, however, e.g., such as a slurry polymerization as described in commonly assigned U.S. Pat. No. 4,067,852 of Gordon W. Calundann, entitled "Melt Processable Thermotropic Wholly Aromatic Polyester Containing Polyoxybenzoyl Moiety" wherein the solid product is suspended in a heat exchange medium, may also be employed. The disclosure of said Calundann patent is herein expressly incorporated by reference.

The reaction is generally conducted until the desired molecular weight (e.g., fiber forming) has been reached. Preferably, the wholly aromatic polyesters of the present invention would have a weight average molecular weight in the range from about 2,000 to about 200,000, more preferably from about 10,000 to about 50,000, and most preferably from about 20,000 to about 25,000. The molecular weight may be determined by standard techniques not involving the solutioning of the polymer, e.g., by end-group determination via infra red spectroscopy on compression molded films. Alternatively, light scattering techniques in a pentafluorophenol solution can be employed to determine the molecular weight.

The inherent viscosity (i.e., I.V.) of the polyester can also be measured, and is preferably at least 2.5, and more preferably at least about 3.5, e.g., from 3.5 to 7.5, when dissolved in pentafluorophenol at a concentration of 0.1 percent by weight at 60° C.

The polyester formed by the process of the present invention is easily melt processable.

Unlike the aromatic polyesters commonly encountered in much of the prior art, the wholly aromatic polyester formed is not intractable and forms an anisotropic melt phase whereby an atypical degree of order is manifest in the molten polymer. The resultant polyester readily forms liquid crystals in the melt phase and accordingly exhibits a high tendency for the polymer chains to orient in the shear direction. Such anisotropic properties are manifest at a temperature which is amenable for melt processing to form shaped articles. Such order in the melt may be confirmed by conventional polarized light techniques whereby crossed polarizers are utilized. More specifically, the anisotropic melt phase may conveniently be confirmed by the use of a Leitz polarizing microscope at a magnification of 40X with the sample on a Leitz hot stage and under a nitrogen atmosphere. The polymer melt is optically anisotropic, i.e., it transmits light when examined between crossed polarizers. The amount of light transmitted increases when the sample is sheared (i.e., is made to flow), however, the sample is optically anisotropic even in the static state.

The present invention provides one with a more economically attractive and direct, yet efficient, method for preparing such wholly aromatic melt processable polyesters than has previously been known. In the process of the present invention, the hydroxynaphthoic acid does not decarboxylate and thereby allows for efficient and effective formation of good polymers of high molecular weight. Moreover, the use of acetylated reactants and the disadvantages thereof are avoided by the process of the instant invention. As a result, the present invention allows one to prepare such valuable polyesters of a hydroxynaphthoic acid, aromatic dicarboxylic acid and aromatic diol, much more cheaply and easily so that the advantages of such polyesters may be more readily exploited.

The following examples are given as specific illustrations of the claimed invention. It should be understood, however, that the specific details set forth in the examples are merely illustrative and in nowise limitative. All parts and percentages in the examples and the remainder of the specification are by weight unless otherwise specified.

EXAMPLE

A 300 ml 3-neck flask was fitted with a sealed glass paddle stirrer, a gas inlet tube and a still-head and condenser. The flask was charged with:
6-hydroxy-2-naphthoic acid—46.4 gm, 0.3 mole
Hydroquinone—12.0 gm, 0.11 mole
Terephthalic Acid—16.6 gm, 0.10 mole
Dibutyl Tin Diacetate (catalyst)—0.2 gm The system was purged by evacuation and flushed with argon three times, and then heated in an oil bath and stirred under a slow stream of argon at 280° C. Water slowly began to distil out of the melt. After one hour, a total of 2.6 mls of water (29% theory) had collected. The temperature was raised to 300° C. for 30 minutes, then to 320° C. for 30 minutes and finally to 340° C. for 30 minutes. A total of 5 mls (56%) of water was collected. During the later stages of the reaction, sublimated solid was melted back into the reaction mixture with the aid of a hot air blower applied to the upper part of the still-head.

A vacuum (0.5 torr) was then slowly applied and the mixture was heated and stirred under vacuum at 340° C. for a total of 95 minutes. The opaque melt grew more viscous until at the end of the vacuum cycle it was beginning to climb up the stirrer shaft. The vacuum was then released with argon and the stirrer being withdrawn from the tan colored, opalescent melt. Long, stiff fibers could be drawn from the molten polymer attached to the stirrer blade. The rest of the polymer was allowed to cool under argon, and then broken out of the flask and separated. Its inherent viscosity as a 0.1% solution in pentafluorophenol at 60° C. was 3.15. When subjected to differential scanning calorimetry (DSC), it showed a $T_m$ endotherm at 275° C. The polymer was then ground in a Wiley Mill.

The powdered polymer was melt spun through a single 0.007 inch spinneret hole at 300° C. at a throughput of 0.14 gm/minute and was wound up at 101 meters/minute. The as-spun yarn had a
- tenacity of 6.1 grams per denier
- elongation of 1.1 percent
- modulus of 664 grams per denier, and a
- denier of 9.6.

The physical properties of the as-spun fibers may be further enhanced by heating in an inert, such as nitrogen, atmosphere, e.g., at about 300° C. for about four hours.

Although the invention has been described with preferred embodiments, it is to be understood that variations and modifications may be resorted to as will be apparent to those skilled in the art. Such variations and modifications are to be considered within the purview and the scope of the claims appended hereto.

What is claimed:

1. A process for preparing a wholly aromatic polyester comprising reacting from 10 to 90 mole percent of at least one hydroxynaphthoic acid, from 5 to 45 mole percent of at least one aromatic dicarboxylic acid and from 5 to 45 mole percent of at least one aromatic diol in the presence of a catalytic amount of a metallic compound selected from the group consisting of the salt, oxide or organo-metallic derivative of antimony, titanium, tin and germanium under polymerization reaction conditions.

2. The process of claim 1 wherein the reaction temperature is sufficient to maintain at least one of the reactants and the resulting polyester in a melt phase.

3. A process for preparing a wholly aromatic polyester comprising reacting from about 60 to 80 mole percent of at least one hydroxynaphthoic acid, from about 10 to about 20 mole percent of at least one aromatic dicarboxylic acid and from about 10 to about 20 mole percent of at least one diol in the presence of a catalytic amount of a metallic compound selected from the group consisting of the salt, oxide or organo-metallic derivative of antimony, titanium, tin and germanium under polymerization reaction conditions.

4. The process defined in claim 1 or 2 wherein the catalyst is dialkyl tin diacetate.

5. The process as defined in claim 1 or 2 wherein 6-hydroxy-2-naphthoic acid is reacted with at least one aromatic dicarboxylic acid and at least one aromatic acid.

6. The process defined in claim 1 or 2 wherein the amount of catalyst employed is in the range of from about 0.001 to about 5 weight percent based upon the total monomer reactant weight.

7. The process defined in claim 6 wherein the amount of catalyst employed is in the range from about 0.05 to about 0.5 weight percent.

8. The process as defined in claim 2 wherein the reaction temperature employed is in the range from about 280° C. to about 360° C.

9. The process as defined in claim 8 wherein the reaction temperature is in the range from about 270° C. to about 340° C.

10. The process as defined in claim 1 or 4 wherein terephthalic acid is reacted with at least one hydroxynaphthoic acid and at least one aromatic diol.

11. The process as defined in claim 1 or 4 wherein hydroquinone is reacted with at least one hydroxynaphthoic acid and at least one aromatic dicarboxylic acid.

12. The process as defined in claim 1 or 4 wherein terephthalic acid, hydroquinone and 6-hydroxy-2-naphthoic acid are reacted.

13. The process defined in claim 2 comprising reacting a composition consisting essentially of 6-hydroxy-2-naphthoic acid, at least one aromatic dicarboxylic acid and at least one aromatic diol at a temperature in the range from about 280° C. to about 360° C.

14. The process defined in claim 13 wherein the catalyst is dialkyl tin diacetate.

15. The process defined in claim 13 wherein the composition reacted consists essentially of 6-hydroxy-2-naphthoic acid, terephthalic acid and hydroquinone.

* * * * *